(No Model.) 2 Sheets—Sheet 2.

J. A. LYNCH.
COUPLING FOR WATER CLOSETS.

No. 465,617. Patented Dec. 22, 1891.

WITNESSES

INVENTOR
James A. Lynch
by his atty
Edward W. Purrell

UNITED STATES PATENT OFFICE.

JAMES A. LYNCH, OF ST. LOUIS, MISSOURI.

COUPLING FOR WATER-CLOSETS.

SPECIFICATION forming part of Letters Patent No. 465,617, dated December 22, 1891.

Application filed August 3, 1891. Serial No. 401,537. (No model.)

*To all whom it may concern:*

Be it known that I, JAMES A. LYNCH, a citizen of the United States, residing at St. Louis, in the State of Missouri, have invented a new and useful Improvement in Couplings for Water-Closets, of which the following is a full, clear, and exact description.

My invention relates to improvements in flexible couplings or joints for pipes, and especially for connecting pipes to water-closet bowls, urinals, basins, or vessels made of earthenware or other material liable to fracture from the use of rigid joints.

My invention has for its object, principally, to provide a water-closet or like bowl with a water-tight coupling, which will not only yield when subjected to undue strain while being coupled or subsequently thereto, and thereby preserve the bowl from fracture, but which may also be shortened or adjusted to any required length, so as to be readily applied at small cost.

It consists in a tube, of rubber or other flexible material, combined with features of novelty as hereinafter claimed.

Figure 1:
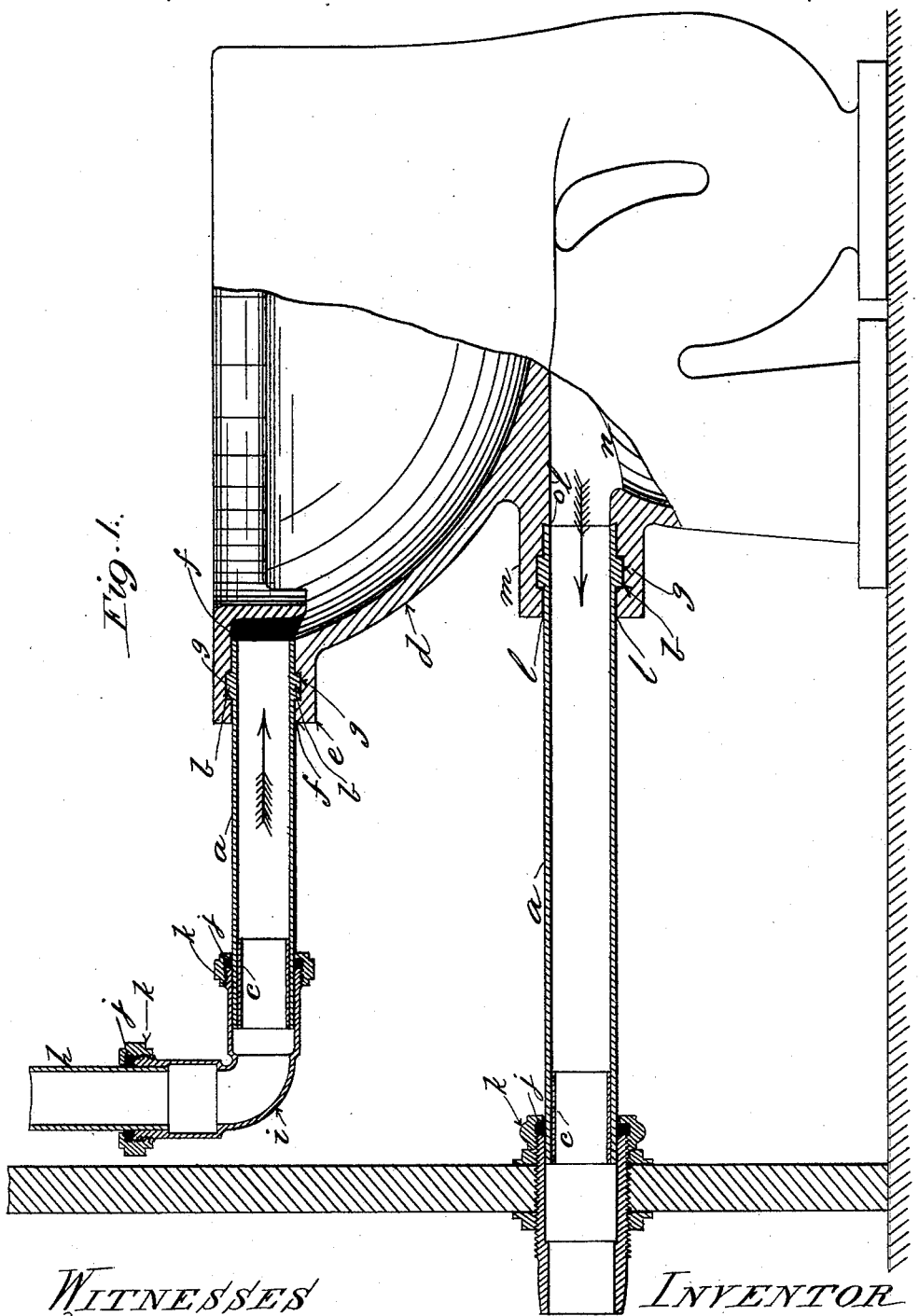
Figure 2:
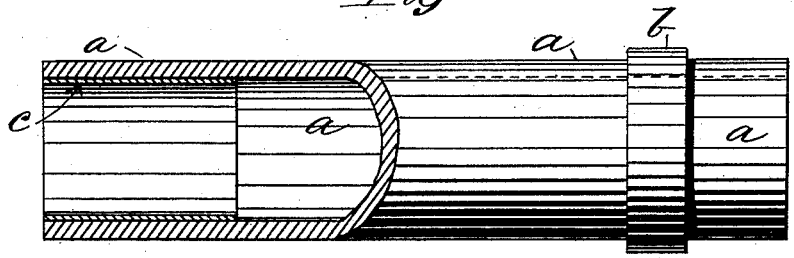
Figure 5:
Figure 3:
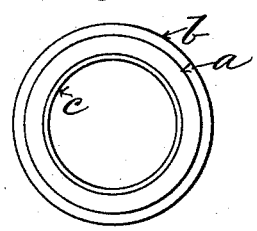
Figure 4:
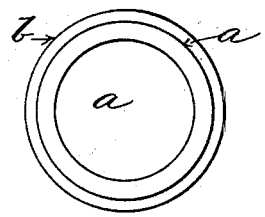

In the accompanying drawings, Figure 1 represents a longitudinal section of my improved flexible coupling as applied to a water-closet bowl; Fig. 2, a detached longitudinal sectional view broken away of the coupling to an enlarged scale; Figs. 3 and 4, left and right hand end views, respectively, of the coupling seen in Fig. 2; Fig. 5, a longitudinal view of the metal tube forming part of the coupling and seen in section to the left of Fig. 2, and Figs. 6, 7, and 8 longitudinal sections of modified forms of the coupling.

Like letters of reference denote like parts in the respective figures.

Referring to Figs. 1 to 5, $a$ represents a cylindrical tube, which is preferably straight longitudinally and composed of rubber or other flexible material of suitable length and thickness. Around and concentric with the tube $a$ at some distance from one end is formed a rib or fillet $b$, which is integral with the body of the tube $a$, and either square-shaped in section, (longitudinally with the tube $a$,) as shown, or semicircular, semi-oval, or V-shaped, as desired. In the other end of the tube $a$ is inserted a metal tube or ferrule $c$ of suitable length and thickness, the metal tube $c$ fitting closely at its circumference against the interior surface of the rubber tube $a$, along which it partly extends. The metal tube $c$ is longitudinally adjustable within the tube $a$ and may be detached therefrom, as seen in Fig. 5.

$d$ represents a water-closet bowl having the supply-horn $e$, through which is a circular passage $f$, communicating with the bowl $d$. In the wall of the passage $f$, at a suitable distance from the mouth of the latter, is formed a circular groove or recess $g$, which is concentric with and extends from the passage $f$, the groove $g$ and passage $f$ corresponding in shape and size, or thereabout, to the rib or fillet $b$ and the adjacent circumferential portion, respectively, of the rubber tube $a$.

$h$ is the supply-pipe to be coupled or joined to the horn $e$ of the closet-bowl $d$. The supply-pipe $h$ is connected at its upper end to the usual overhead tank and at its lower end to a metal elbow $i$, which is provided with packing-rings $j$, made of rubber or like material, and with glands $k$ for tightening the packings $j$.

Figure 8:
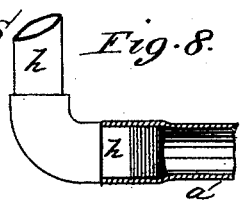

In applying my improved coupling the end portion of the rubber tube $a$, carrying the rib or fillet $b$, is constrained to enter the passage $f$ of the horn $e$ until the rib or fillet $b$ is coincident with the groove or recess $g$, when the tube $a$ is released, and recovering its normal shape the fillet $b$ enters and occupies the groove or recess $g$, so that the tube $a$ cannot be withdrawn longitudinally from the horn $e$. At the same time the circumferential portion of the tube $a$ on each side of the fillet $b$ fits closely against the wall of the passage $f$ and effects a water-tight joint therewith without the necessity of using any auxiliary packing device, such as a gland and washer. The rubber tube $a$ being then adjusted at its plain or free end to the distance between the horn $e$ and the metal elbow $i$ on the supply-pipe $h$, the gland $k$, with its packing-ring $j$, is slipped around the rubber tube $a$ and the metal tube or ferrule $c$ placed within the tube $a$, so as to be flush, or thereabout, with the free end of the tube $a$, which is then inserted within the elbow $i$, and the gland $k$ screwed home against the packing-ring $j$, so as to press the latter around upon the rubber tube $a$, which being sustained by and tightened against the metal tube $c$ a water-tight joint between the elbow $i$ and tube $a$ is thereby established; or in lieu of the elbow $i$, any other suitable pipe-fitting having a packing device may be used in connection with the supply-pipe $h$ and my improved coupling; or the packing may be dispensed with and the free end of the coupling-tube $a$ enlarged or stretched over the end of the pipe $h$, as seen in Fig. 8, in which case the metal tube $c$ is not used.

Figure 6:
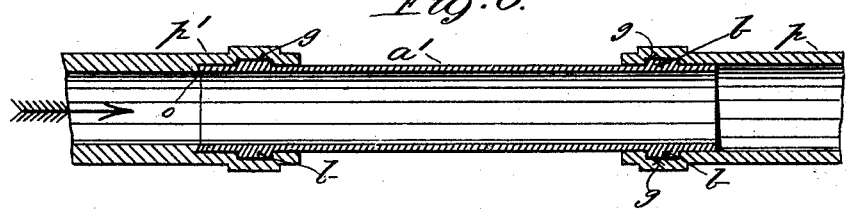

In the application of my improved coupling or joint to the passage $l$ in the horn $m$, communicating with the discharge-pipe $n$ of the closet-bowl $d$, where the direction of the current is reversed, as indicated by the arrows in Fig. 1, the inner end of the tube $a$ butts against a shoulder $o$, which is formed by reducing the diameter of the passage $l$ thereat and in the direction of the discharge-pipe $n$, so as to be flush with or slightly smaller than the interior of the tube $a$, whereby the said end of the tube $a$, which may be either square or slightly flaring, as shown in Figs. 1 and 6, is prevented from buckling, which might otherwise occur from the action of the pressure.

Fig. 6 illustrates a modification of my improved coupling, which may be applied to any arrangement of pipes or pipe-fittings where a flexible junction is desired. In this case the metal tube $c$ is dispensed with and the rubber tube $a'$ provided near each end with a rib or fillet $b$ for insertion with the adjacent end portion of the tube $a'$ into the correspondingly-shaped ends, respectively, of the pipes or fittings $p\ p'$, as in the case of the horns $e\ m$, respectively, in Fig. 1, the arrow shown in Fig. 6 indicating the direction of the current or pressure through the pipes and coupling.

Figure 7:
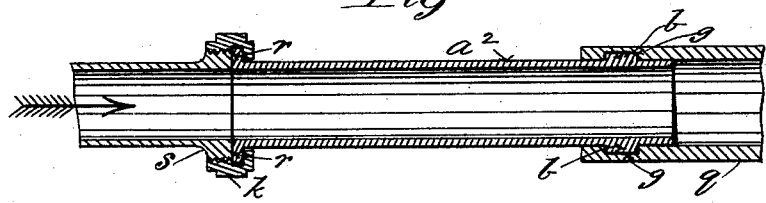

In Fig. 7 one end only of the rubber tube $a^2$ is provided with a rib or fillet $b$, which engages in the groove $g$, formed in the pipe or fitting $q$, while the other end of the tube $a^2$ is formed with a flange $r$, which is integral with the body of the tube $a^2$ and connected with the coupling $s$ by the threaded sleeve or gland $k$, the latter being of the usual well-known construction for tightening packing, which in this case is replaced by the flange $r$ of the tube $a^2$.

What I claim, and desire to secure by Letters Patent, is—

1. The combination, with the horn of a water-closet or analogous bowl and the metal supply-pipe thereto or fitting connected to said pipe, of a rubber or other flexible tube, the said tube containing at one end a metal tube or ferrule and encircled at some distance from its other end by a rib or fillet which engages in a correspondingly-shaped groove or recess formed in the wall of the passage through the horn, the circumferential portion of the tube at each side of the said rib or fillet bearing against the wall of the passage, substantially as shown, and for the purpose described.

2. The combination, with the horn of a water-closet or analogous bowl and the metal supply-pipe thereto or fitting connected to said pipe, of a rubber or other flexible tube, the said tube being encircled at some distance from its end by a rib or fillet which engages in a correspondingly-shaped groove or recess formed in the wall of the passage through the horn, the circumferential portion of the tube at each side of the said rib or fillet bearing against the wall of the passage, substantially as shown, and for the purpose described.

3. The combination, with the horn of a water-closet or analogous bowl, of a rubber or other flexible tube, the said tube being encircled at some distance from its end by a rib or fillet which engages in a correspondingly-shaped groove or recess formed in the wall of the passage through the horn, the circumferential portion of the tube at each side of the said rib bearing against the wall of the passage and the said end of the tube within the horn butting against a shoulder formed by reducing the diameter of the said passage thereat, substantially as shown, and for the purpose set forth.

JAMES A. LYNCH.

Witnesses:
J. H. CAVENDER,
JAS. PAINTER.